US011172327B2

(12) United States Patent
Nguyen et al.

(10) Patent No.: US 11,172,327 B2
(45) Date of Patent: Nov. 9, 2021

(54) RELAYING FOR VEHICULAR COMMUNICATIONS

(71) Applicant: QUALCOMM Incorporated, San Diego, CA (US)

(72) Inventors: Tien Viet Nguyen, Bridgewater, NJ (US); Shailesh Patil, San Diego, CA (US); Sudhir Kumar Baghel, Hillsborough, NJ (US); Junyi Li, Chester, NJ (US); Kapil Gulati, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/505,526

(22) Filed: Jul. 8, 2019

(65) Prior Publication Data

US 2020/0021941 A1    Jan. 16, 2020

Related U.S. Application Data

(60) Provisional application No. 62/697,117, filed on Jul. 12, 2018.

(51) Int. Cl.
*H04W 4/40* (2018.01)
*H04W 4/02* (2018.01)
(Continued)

(52) U.S. Cl.
CPC ............ *H04W 4/023* (2013.01); *H04B 7/155* (2013.01); *H04L 67/104* (2013.01); *H04W 4/027* (2013.01); *H04W 4/40* (2018.02); *H04W 88/04* (2013.01)

(58) Field of Classification Search
CPC ......... H04W 4/70; H04W 4/40; H04W 72/02; H04W 4/46; H04W 92/18; H04W 72/042;
(Continued)

(56) References Cited

U.S. PATENT DOCUMENTS

2012/0044815 A1*  2/2012  Geirhofer ........... H04W 52/243
                                              370/248
2013/0316727 A1* 11/2013  Edge ....................... H04L 67/12
                                              455/456.1
(Continued)

FOREIGN PATENT DOCUMENTS

EP       2252111 A1    11/2010
EP       3432613 A1     1/2019
(Continued)

OTHER PUBLICATIONS

International Search Report and Written Opinion—PCT/US2019/041048—ISA/EPO—dated Oct. 15, 2019.

*Primary Examiner* — Tu X Nguyen
(74) *Attorney, Agent, or Firm* — Danai Nelisile Mhembere; Harrity & Harrity, LLP

(57) ABSTRACT

Aspects of the present disclosure generally relate to wireless communication. In some aspects, a user equipment (UE) may determine whether a peer-to-peer (P2P) communication is to be relayed based at least in part on a location of the UE and a range requirement associated with the P2P communication; and transmit the P2P communication, wherein the P2P communication includes an indication of whether the P2P communication is to be relayed. In some aspects, a UE may receive the P2P communication; determine whether to relay the P2P communication based at least in part on the indication and at least one of: a location of the UE, or a UE identifier, included in the P2P communication, that identifies the UE and is associated with a request for the UE to relay the P2P communication; and selectively relay the P2P communication based at least in part on determining whether to relay the P2P communication.

18 Claims, 8 Drawing Sheets

(51) Int. Cl.
  *H04B 7/155* (2006.01)
  *H04L 29/08* (2006.01)
  *H04W 88/04* (2009.01)

(58) Field of Classification Search
  CPC . H04W 28/0268; H04W 8/082; H04W 4/027;
  G05D 2201/0213; H04L 2209/84; H04B
  7/0617; H04B 7/14; H04B 7/15528;
  H04H 20/08
  See application file for complete search history.

(56) References Cited

U.S. PATENT DOCUMENTS

| | | | | |
|---|---|---|---|---|
| 2017/0325243 | A1* | 11/2017 | Yasukawa | H04W 88/04 |
| 2018/0070400 | A1* | 3/2018 | Wu | H04W 72/0406 |
| 2018/0084478 | A1* | 3/2018 | Lee | H04W 28/12 |
| 2020/0059915 | A1* | 2/2020 | Lee | H04W 72/0406 |
| 2020/0092685 | A1* | 3/2020 | Fehrenbach | H04B 7/2606 |

FOREIGN PATENT DOCUMENTS

| | | | |
|---|---|---|---|
| EP | 3531647 | A1 | 8/2019 |
| WO | 2016163733 | A1 | 10/2016 |
| WO | 2018000262 | A1 | 1/2018 |
| WO | 2018095550 | A1 | 5/2018 |
| WO | 2018119667 | A1 | 7/2018 |

\* cited by examiner

RELAYING FOR VEHICULAR COMMUNICATIONS

CROSS-REFERENCE TO RELATED APPLICATIONS UNDER 35 U.S.C. § 119

This application claims priority to U.S. Provisional Patent Application No. 62/697,117, filed on Jul. 12, 2018, entitled "TECHNIQUES AND APPARATUSES FOR RELAYING FOR VEHICULAR COMMUNICATIONS," which is hereby expressly incorporated by reference herein.

FIELD OF THE DISCLOSURE

Aspects of the present disclosure generally relate to wireless communication and to techniques and apparatuses for relaying for vehicular communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining whether a peer-to-peer (P2P) communication is to be relayed based at least in part on a location of the UE and a range requirement associated with the P2P communication; and transmitting the P2P communication, wherein the P2P communication includes an indication of whether the P2P communication is to be relayed.

In some aspects, a UE for wireless communication may include memory and one or more processors operatively coupled to the memory. The memory and the one or more processors may be configured to determine whether a P2P communication is to be relayed based at least in part on a location of the UE and a range requirement associated with the P2P communication; and transmit the P2P communication, wherein the P2P communication includes an indication of whether the P2P communication is to be relayed.

In some aspects, a non-transitory computer-readable medium may store one or more instructions for wireless communication. The one or more instructions, when executed by one or more processors of a UE, may cause the one or more processors to determine whether a P2P communication is to be relayed based at least in part on a location of the UE and a range requirement associated with the P2P communication; and transmit the P2P communication, wherein the P2P communication includes an indication of whether the P2P communication is to be relayed.

In some aspects, an apparatus for wireless communication may include means for determining whether a P2P communication is to be relayed based at least in part on a location of the apparatus and a range requirement associated with the P2P communication; and means for transmitting the P2P communication, wherein the P2P communication includes an indication of whether the P2P communication is to be relayed.

In some aspects, a method of wireless communication, performed by a UE, may include receiving a P2P communication that includes an indication of whether the P2P communication is to be relayed; determining whether to relay the P2P communication based at least in part on the indication and at least one of: a location of the UE, or a UE identifier, included in the P2P communication, that identifies the UE and is associated with a request for the UE to relay the P2P communication; and selectively relaying the P2P communication based at least in part on determining whether to relay the P2P communication.

In some aspects, a UE for wireless communication may include memory and one or more processors operatively coupled to the memory. The memory and the one or more processors may be configured to receive a P2P communication that includes an indication of whether the P2P communication is to be relayed; determine whether to relay the P2P communication based at least in part on the indication and at least one of: a location of the UE, or a UE identifier, included in the P2P communication, that identifies the UE and is associated with a request for the UE to relay the P2P communication; and selectively relay the P2P communication based at least in part on determining whether to relay the P2P communication.

In some aspects, a non-transitory computer-readable medium may store one or more instructions for wireless communication. The one or more instructions, when executed by one or more processors of a UE, may cause the one or more processors to receive a P2P communication that includes an indication of whether the P2P communication is to be relayed; determine whether to relay the P2P communication based at least in part on the indication and at least one of: a location of the UE, or a UE identifier, included in the P2P communication, that identifies the UE and is associated with a request for the UE to relay the P2P communication; and selectively relay the P2P communication based at least in part on determining whether to relay the P2P communication.

In some aspects, an apparatus for wireless communication may include means for receiving a P2P communication that includes an indication of whether the P2P communication is to be relayed; means for determining whether to relay the P2P communication based at least in part on the indication and at least one of: a location of the apparatus, or an apparatus identifier, included in the P2P communication, that identifies the apparatus and is associated with a request for the apparatus to relay the P2P communication; and means for selectively relaying the P2P communication based at least in part on determining whether to relay the P2P communication.

Aspects generally include a method, apparatus, system, computer program product, non-transitory computer-readable medium, user equipment, originating user equipment, relaying user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
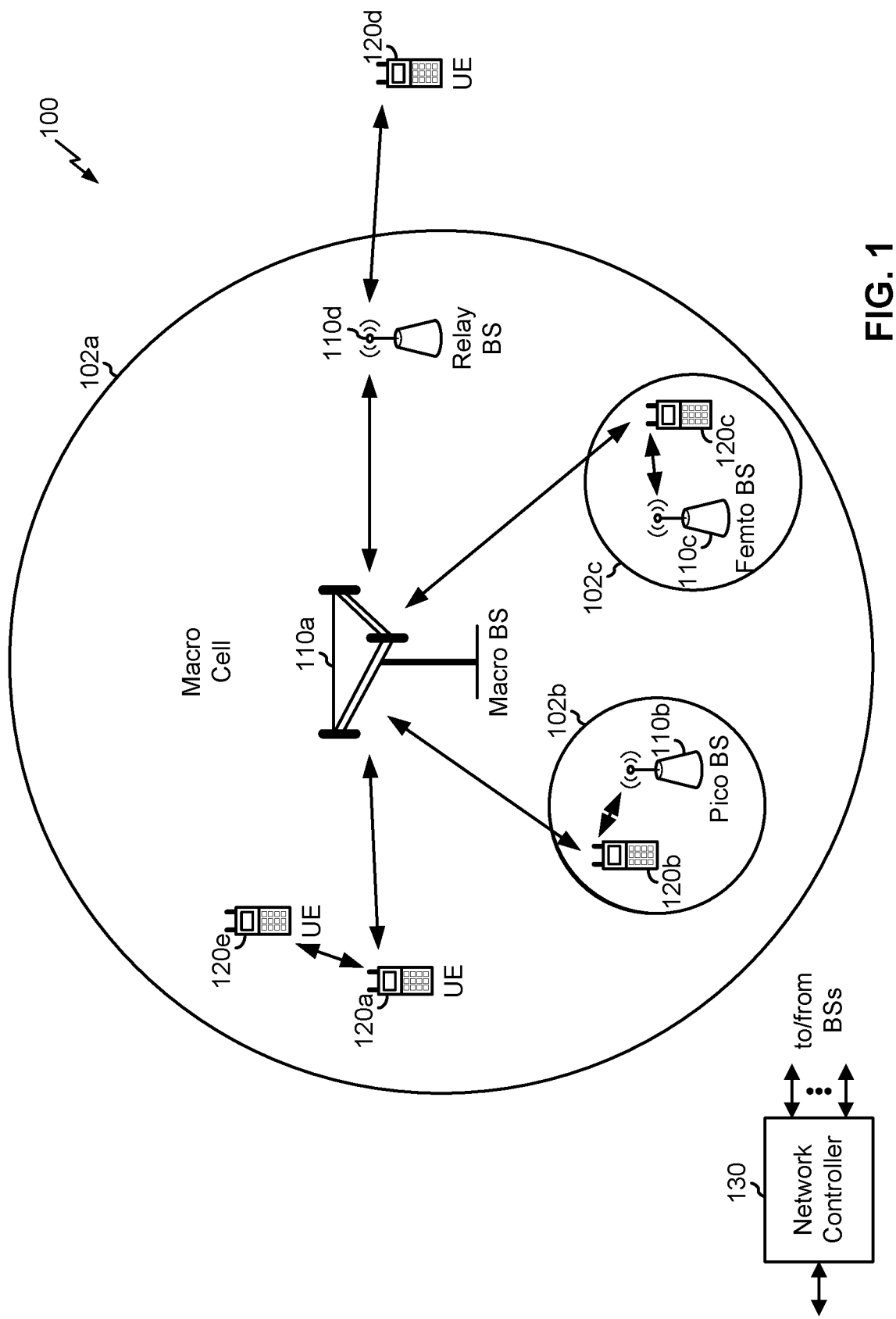
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of B Ss 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). Such direct communications via a sidelink channel may be referred to as peer-to-peer (P2P) communications, which may include device-to-device (D2D) communications, vehicle-to-everything (V2X) communications that use a V2X protocol (e.g., which may include a vehicle-to-vehicle (V2V) protocol, a vehicle-to-infrastructure (V2I) protocol, a vehicle-to-pedestrian (V2P) protocol, and/or the like), communications via a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
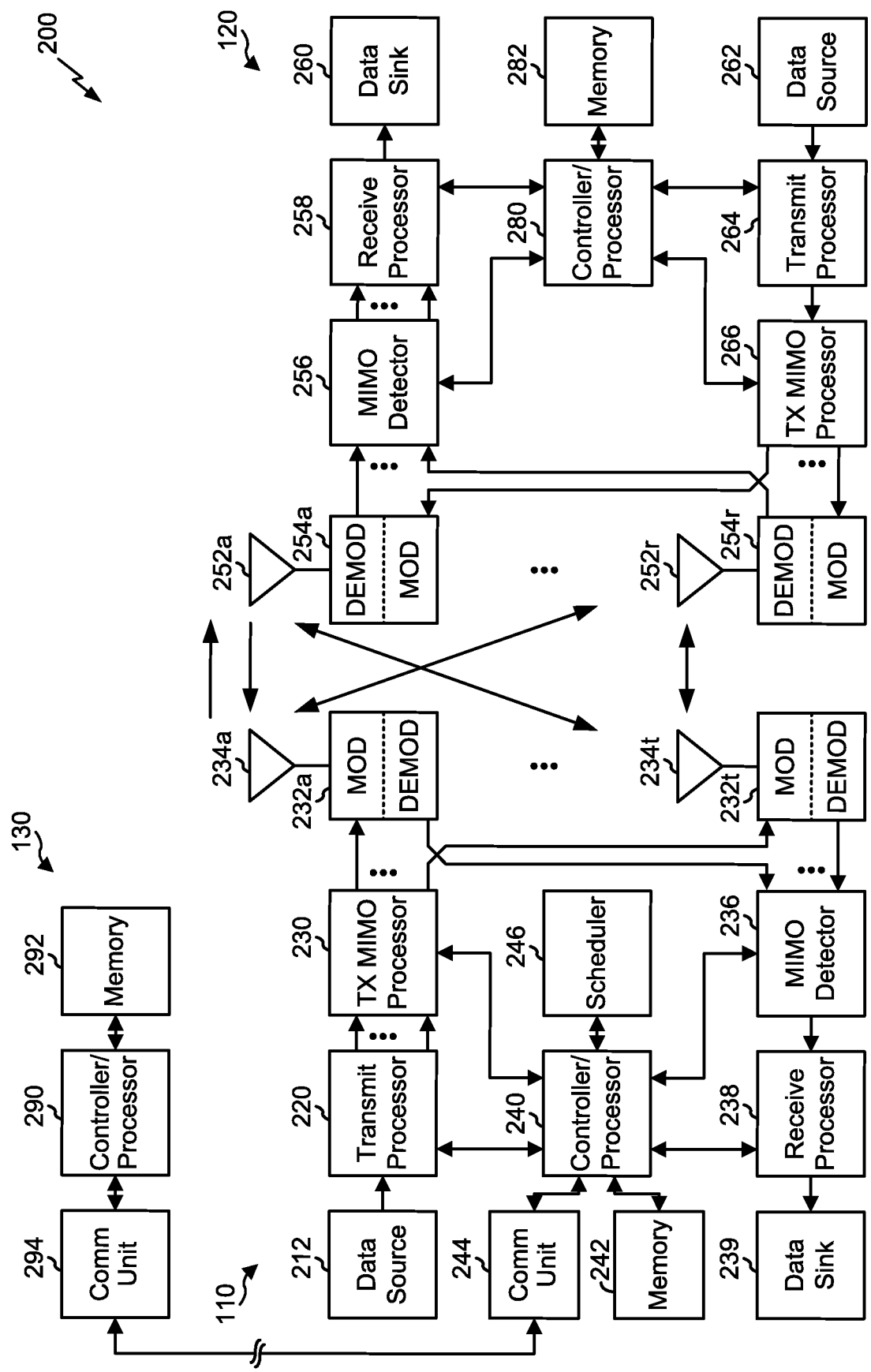
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with relaying for vehicular communications, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining whether a peer-to-peer (P2P) communication is to be relayed based at least in part on a location of the UE and a range requirement associated with the P2P communication; means for transmitting the P2P communication, wherein the P2P communication includes an indication of whether the P2P communication is to be relayed; and/or the like. Additionally, or alternatively, UE 120 may include means for receiving a peer-to-peer (P2P) communication that includes an indication of whether the P2P communication is to be relayed; means for determining whether to relay the P2P communication based at least in part on the indication and at least one of: a location of the UE, or a UE identifier, included in the P2P communication, that identifies the UE and is associated with a request for the UE to relay the P2P communication; means for selectively relaying the P2P communication based at least in part on determining whether to relay the P2P communication; and/or the like. In some aspects, such means may include one or more components of UE 120 described in connection with FIG. 2, such as antenna 252, receive processor 258, transmit processor 264, controller/processor 280, memory 282, and/or the like.

As indicated above, FIG. 2 is provided merely as an example. Other examples may differ from what is described with regard to FIG. 2.

Figure 3:
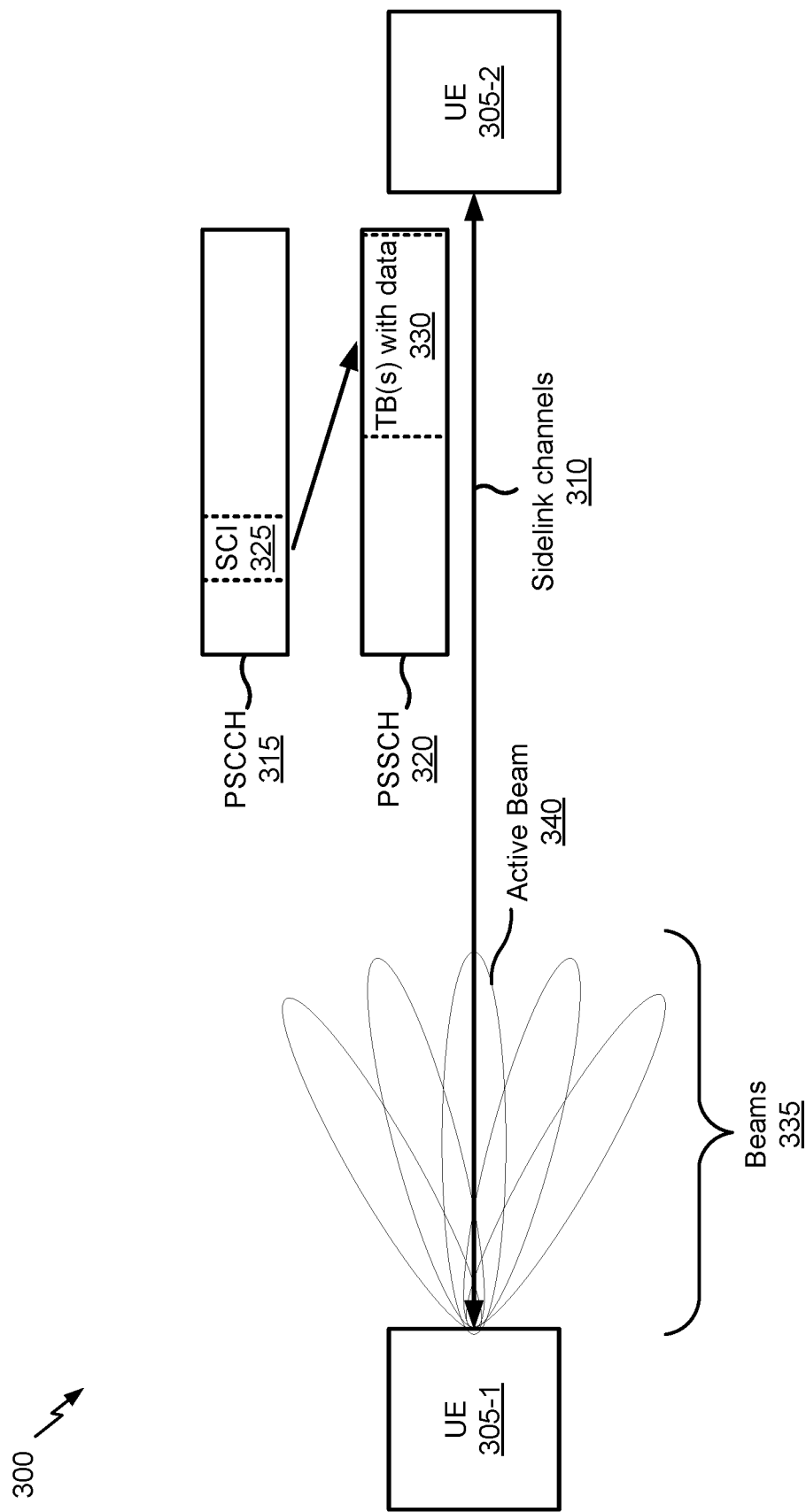
FIG. 3 is a block diagram conceptually illustrating an example of peer-to-peer (P2P) communications via a sidelink, in accordance with various aspects of the present disclosure.

FIG. 3 is a block diagram conceptually illustrating an example of peer-to-peer (P2P) communications via a sidelink, in accordance with various aspects of the present disclosure.

As shown in FIG. 3, a first UE 305-1 may communicate with a second UE 305-2 (and one or more other UEs 305 similar to second UE 305-2) using peer-to-peer (P2P) communications via one or more sidelink channels 310. In some aspects, the UEs 305 may correspond to one or more other UEs described elsewhere herein, such as UE 120 and/or the like. In some aspects, the sidelink channel 310 may use a PC5 interface and/or may operate in a high frequency band (e.g., the 5.9 GHz band). Additionally, or alternatively, the UEs 305 may synchronize timing of transmission time intervals (e.g., frames, subframes, slots, and/or the like) using global navigation satellite system (GNSS) timing. The UEs 305 may transmit P2P communications, such as V2X communications and/or the like, using the sidelink channel 310.

In some aspects, V2X communications may be one-to-many broadcast and/or multicast communications. In some aspects, V2X communications may not require any physical layer feedback from receiving devices, such as acknowledgement (ACK) or negative acknowledgement (NACK) feedback. In some aspects, V2X communications may be configured without retransmission. In some aspects, V2X communications may be configured with a small number of retransmissions (e.g., one retransmission) that always occur (e.g., without ACK/NACK feedback).

As further shown in FIG. 3, the sidelink channel 310 may include a physical sidelink control channel (PSCCH) 315 and a physical sidelink shared channel (PSSCH) 320. The PSCCH 315 may be used to communicate control information, similar to a physical downlink control channel (PDCCH) and/or a physical uplink control channel (PUCCH) used for communications with a base station 110. The PSSCH 320 may be used to communicate data, similar to a physical downlink shared channel (PDSCH) and/or a physical uplink shared channel (PUSCH) used for communications with a base station 110. For example, the PSCCH 315 may carry sidelink control information (SCI) 325, which may indicate various control information used for sidelink communications, such as one or more resources (e.g., time, frequency, and/or beam resources) where a transport block (TB) 330 that includes data is carried on the PSSCH 320 and/or other control information that may be used to assist in receiving, decoding, and/or demodulating data carried via the PSSCH 320. The TB 330 may include a V2X data communication, such as a basic safety message (BSM), a traffic information message (TIM), a signal phase and time (SPAT) message, a MAP message to convey geographic road information, a cooperative awareness message (CAM), a distributed environment notification message (DENM), an in-vehicle information (IVI) message, and/or the like. In some aspects, the V2X data communication may include data relevant to operation of a vehicle associated with a UE 305.

In some aspects, a UE 305 may operate using transmission mode 4, where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of V2X communications based at least in part on the measurement(s).

Additionally, or alternatively, the UE 305 may perform resource selection and/or scheduling using SCI 325 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

As further shown in FIG. 3, a UE 305 may communicate with other UEs 305 using one or more beams 335, such as an active beam 340. For example, the UEs 305 may include multiple antenna elements to support beamforming using millimeter wave beams 335 in the millimeter wave frequency band. A millimeter wave beam 335 may be capable of higher throughput than a sub-6 GHz transmission, which may be useful for V2X communications (e.g., to transmit camera feeds and/or the like). In some aspects, the UE 305 may support and/or dynamically configure different beam widths for a beam 335, which may change the range of the beam 335. For example, using a wider beam may result in a shorter range than a narrower beam, while using a narrower beam may result in a longer range than a wider beam. Some techniques and apparatuses described herein may increase the range of P2P communications and/or V2X communications (without adjusting the beam width) by using relaying, as described in more detail below.

As indicated above, FIG. 3 is provided merely as an example. Other examples may differ from what is described with regard to FIG. 3.

Figure 4:
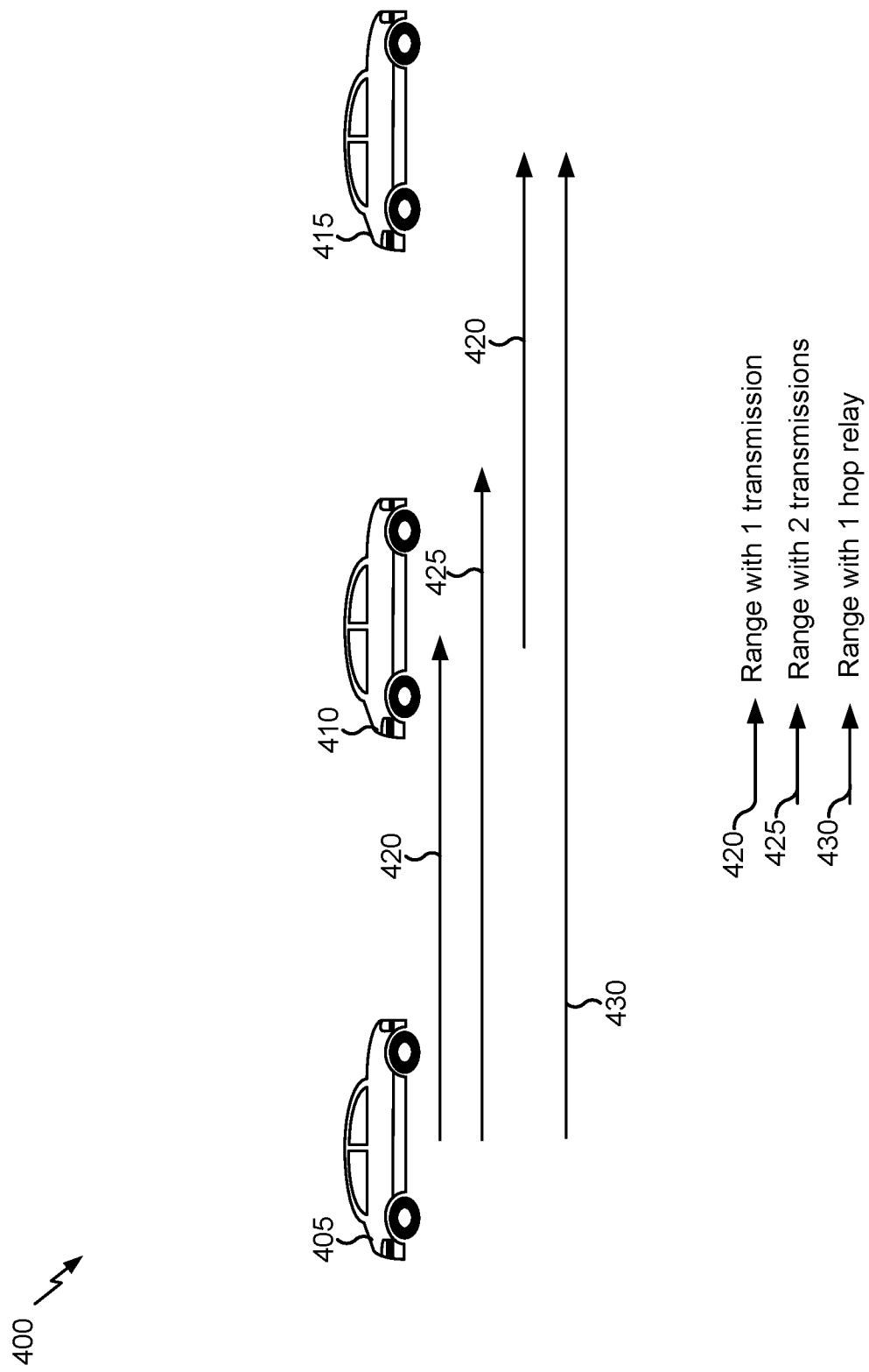
FIGS. 4-6 are diagrams illustrating examples of relaying for vehicular communications, in accordance with various aspects of the present disclosure.

FIG. 4 is a diagram illustrating an example 400 of relaying for vehicular communications, in accordance with various aspects of the present disclosure.

As shown in FIG. 4, an originating UE 405 may be associated with an originating vehicle, a relaying UE 410 may be associated with a relaying vehicle, and a receiving UE 415 may be associated with a receiving vehicle. The originating UE 405, the relaying UE 410, and/or the receiving UE 415 may correspond to one or more UEs described elsewhere herein, such as UE 120, UE 305, and/or the like. In some aspects, a UE 405, 410, 415 may be integrated into a vehicle, may be located in or on the vehicle, and/or the like. A vehicle may include an autonomous vehicle, a semi-autonomous vehicle, a non-autonomous vehicle, and/or the like. Although UEs 405, 410, 415 in FIG. 4 are shown as being associated with vehicles, in some aspects, one or more of the UEs 405, 410, 415 may not be associated with a vehicle. For example, a UE 405, 410, 415 may be associated with infrastructure (e.g., traffic infrastructure, such as a traffic signal, a lane signal, a sensor, a traffic controller system, and/or the like), a pedestrian (e.g., via a wearable device), and/or the like.

The UEs 405, 410, 415 may communicate via one or more sidelink channels 310 to exchange SCI 325 and corresponding TBs 330, as described above in connection with FIG. 3. As used herein, an originating UE 405 may refer to a UE that schedules an original (e.g., initial) transmission of a V2X communication and transmits the V2X communication to a relaying UE 410 and/or a receiving UE 415. As used herein, a relaying UE 410 may refer to a UE that receives a V2X communication (e.g., from an originating UE 405) and relays (e.g., retransmits) the V2X communication. As used herein, a receiving UE 415 may refer to a UE that receives the V2X communication from the originating UE 405 and/or the relaying UE 410. Thus, a single UE may be capable of operating as an originating UE 405 (e.g., that transmits a V2X communication to one or more other UEs), a relaying UE 410 (e.g., that relays a V2X communications received from another UE), and a receiving UE 415 (e.g., that receives a V2X communication from another UE). Although some aspects are described herein in connection with V2X communications, these aspects may similarly apply to other types of P2P communications.

In a V2X communication scenario, having a long range (e.g., transmission range) for V2X communications is particularly important because vehicles may move quickly and transmit critical safety information. For example, increasing the range by 50 meters is equivalent to an increase in reaction time of 360 milliseconds (ms) at a speed of 250 kilometers per hour (km/h), and is equivalent to an increase in reaction time of 640 ms at a speed of 140 km/h.

As shown by reference number 420, a V2X communication transmitted by the originating UE 405 may have a limited range (e.g., transmission range). The range may depend on, for example, a beam width of a beam that carries the V2X communication, a bandwidth for the V2X communication, a transmit power with which the V2X communication is transmitted, a modulation and coding scheme (MCS) used to transmit the V2X communication, a length of time that the V2X communication is transmitted, a number of retransmissions of the V2X communication, and/or the like. In some cases, the originating UE 405 may increase the range by modifying one or more of these factors, such as by transmitting on a narrower beam, increasing the transmit power, reducing the MCS, increasing the length of time of the transmission, increasing a number of retransmissions, and/or the like.

For example, as shown by reference number 425, the originating UE 405 may increase the range by retransmitting the V2X communication. However, this may provide only a limited increase in range due to pathloss conditions (e.g., a 20% increase in range for line of sight communications, a 5% increase in range for non-line of sight communications, and/or the like). Such pathloss conditions depend on a location of the originating UE 405, and may not be controlled by the originating UE 405 at the time of transmission. Furthermore, while modifying one or more of the factors described above may increase range, such modifications may have negative performance impacts, may consume additional network resources, may be limited by a capability of the originating UE 405, may consume additional resources of the originating UE 405 (e.g., processing resources, memory, battery power, and/or the like), and/or the like. Furthermore, some of these factors may only improve range for a data channel (e.g., PSSCH 320) and not a control channel (PSCCH 315). For example, retransmission may not be capable of increasing range of a transmission on a control channel because control information cannot typically be combined for different transmission and/or retransmission occasions. As a result, a range of a transmission on a data channel may also not be increased because if the control information is not received by a receiving UE 415, then the receiving UE 415 may be unable to locate the corresponding data.

Some techniques and apparatuses described herein increase the range of P2P communications and/or V2X communications using relaying. Relaying may refer to transmission of a communication by a UE that receives the communication from another UE. For example, as shown by reference number 430, the originating UE 405 may transmit a V2X communication, the relaying UE 410 may receive the V2X communication from the originating UE 405, and the relaying UE 410 may transmit the V2X communication (e.g., to the receiving UE 415). In this way, transmission range may be significantly increased. For example, relaying may provide up to a 100% increase in range. Additional details regarding relaying P2P communications and/or V2X communications are described below.

As indicated above, FIG. 4 is provided as an example. Other examples may differ from what is described with respect to FIG. 4.

Figure 5:
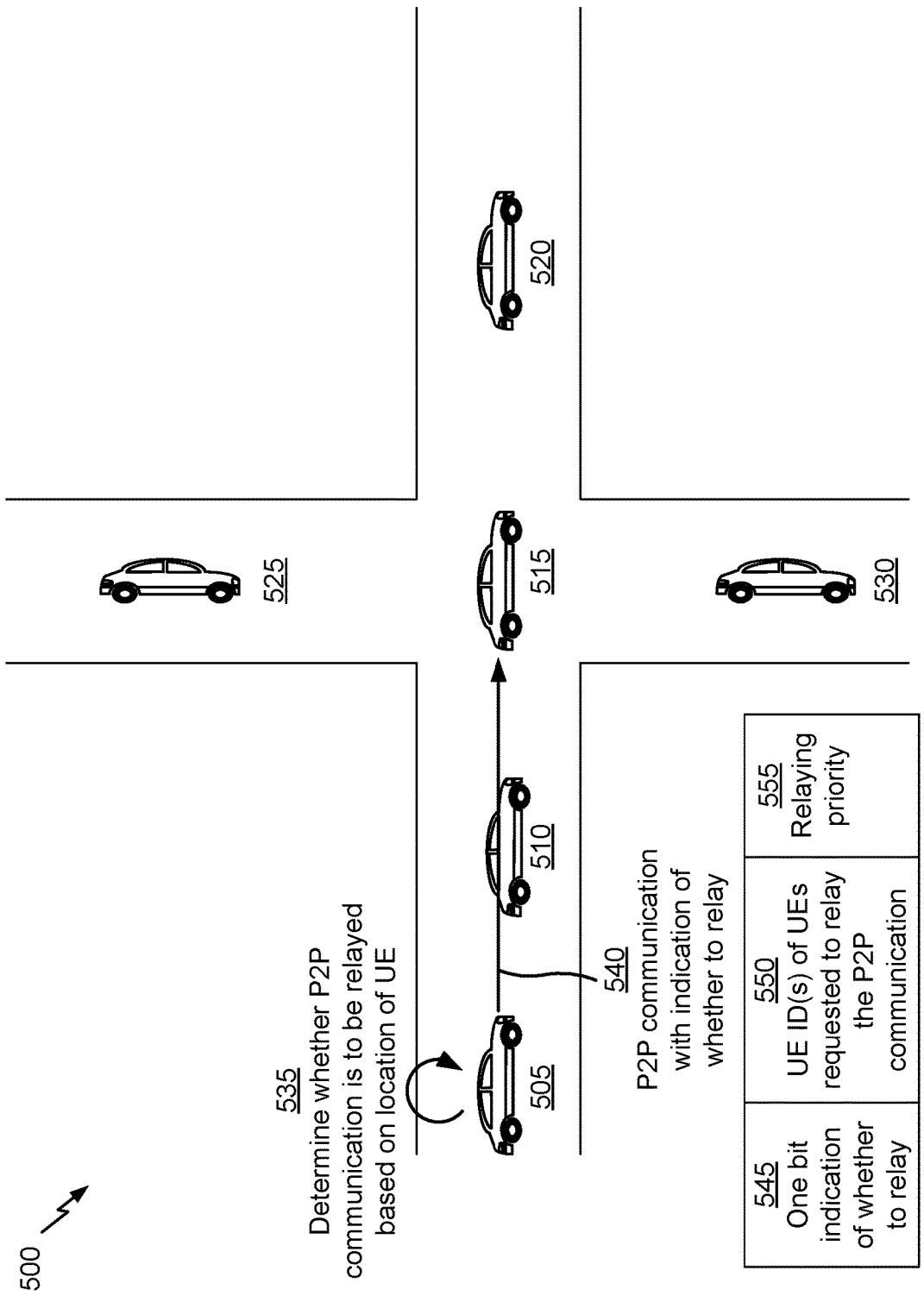

FIG. 5 is a diagram illustrating an example 500 of relaying for vehicular communications, in accordance with various aspects of the present disclosure.

As shown in FIG. 5, various UEs 505, 510, 515, 520, 525, and 530 may be associated with respective vehicles. These UEs may correspond to one or more UEs described elsewhere herein, such as UE 120, UE 305, UE 405, UE 410, UE 415, and/or the like. Although the UEs in FIG. 5 are shown as being associated with vehicles, in some aspects, one or more of the UEs in FIG. 5 may not be associated with a vehicle. For example, a UE 505, 510, 515, 520, 525, and/or 530 may be associated with infrastructure, a pedestrian, and/or the like. In FIG. 5, the UE 505 acts as an originating UE.

As shown by reference number 535, the UE 505 may determine whether a peer-to-peer (P2P) communication is to be relayed based at least in part on a location of the UE 505. In some aspects, the location of the UE 505 may be associated with a pathloss parameter that impacts a range of transmission of the P2P communication. In this case, the UE 505 may determine whether the P2P communication is to be relayed based at least in part on the pathloss parameter. For example, if the pathloss parameter indicates a relatively large pathloss (e.g., greater than or equal to a threshold), then the UE 505 may determine that the P2P communication is to be relayed, thereby improving range when the UE 505 has a small range due to the large pathloss. Conversely, if the pathloss parameter indicates a relatively small pathloss (e.g., less than or equal to a threshold), then the UE 505 may determine that the P2P communication is not to be relayed, thereby conserving network resources and resources of a relaying UE when the UE 505 has a large range due to the small pathloss. In some aspects, the UE 505 may estimate the pathloss. Additionally, or alternatively, the UE 505 may receive information from one or more other devices (e.g., a base station 110, another UE, and/or the like) that indicates a pathloss associated with a location of the UE 505 (e.g., within a threshold proximity of the location of the UE 505).

Additionally, or alternatively, the location of the UE 505 may be associated with a range estimation for communications. In this case, the UE 505 may determine whether the P2P communication is to be relayed based at least in part on the range estimation. For example, if the range estimation indicates a relatively small range (e.g., less than or equal to a threshold), then the UE 505 may determine that the P2P communication is to be relayed, thereby improving range when the UE 505 has a small range. Conversely, if the range estimation indicates a relatively large range (e.g., greater than or equal to a threshold), then the UE 505 may determine that the P2P communication is not to be relayed, thereby conserving network resources and resources of a relaying UE when the UE 505 has a large range. In some aspects, the UE 505 may estimate the range for the location. Additionally, or alternatively, the UE 505 may receive information from one or more other devices (e.g., a base station 110, another UE, and/or the like) that indicates an estimated range associated with a location of the UE 505 (e.g., within a threshold proximity of the location of the UE 505).

Additionally, or alternatively, the UE 505 may determine whether the P2P communication is to be relayed based at least in part on a range requirement associated with the P2P communication. In some aspects, the range requirement many be indicated by a quality of service (QoS) parameter of the P2P communication and/or a similar type of requirement. In some aspects, the UE 505 may determine that the P2P communication is to be relayed if the P2P communication is associated with a relatively high range requirement (e.g., greater than or equal to a threshold), thereby increasing a likelihood that the range requirement is satisfied. Conversely, the UE 505 may determine that the P2P communication is not to be relayed if the P2P communication is associated with a relatively low range requirement (e.g., less than or equal to a threshold), thereby conserving resources when the range requirement is likely to be satisfied without using relaying.

In some aspects, the UE 505 may use the range estimation as a threshold to which the range requirement is to be compared. The UE 505 may estimate the range based at least in part on one or more factors that impact the range, such as a transmit power, an MCS, a pathloss condition, a line of sight condition, and/or the like (e.g., as described above in connection with FIG. 4). In this case, if the range requirement is greater than the estimated range, then the UE 505 may determine that the P2P communication is to be relayed. Conversely, if the range requirement is less than or equal to the estimated range, then the UE 505 may determine that the P2P communication is not to be relayed.

Additionally, or alternatively, the UE 505 may determine whether the P2P communication is to be relayed based at least in part on a priority associated with the P2P communication. In some aspects, the priority may be a packet priority of the P2P communication, a priority associated with a QoS requirement of the P2P communication, and/or the like. In some aspects, the priority may be indicated by an application, executing on the UE 505, that generates data for the P2P communication. In some aspects, the UE 505 may determine that the P2P communication is to be relayed if the P2P communication is associated with a relatively high priority (e.g., greater than or equal to a threshold), thereby increasing range for high priority P2P communications. Conversely, the UE 505 may determine that the P2P communication is not to be relayed if the P2P communication is associated with a relatively low priority (e.g., less than or equal to a threshold), thereby conserving resources when the P2P communication is low priority.

Additionally, or alternatively, the UE 505 may determine whether the P2P communication is to be relayed based at least in part on a speed of the UE 505. For example, the UE 505 may determine that the P2P communication is to be relayed if the UE 505 is moving at a relatively high speed (e.g., greater than or equal to a threshold), thereby increasing range when reaction time to the UE 505 is lower due to the high speed. Conversely, the UE 505 may determine that the P2P communication is not to be relayed if the UE 505 is moving at a relatively low speed (e.g., less than or equal to a threshold), thereby conserving resources when reaction time to the UE 505 is higher due to the low speed.

As shown by reference number 540, the UE 505 may transmit the P2P communication. The P2P communication may include an indication of whether the P2P communication is to be relayed. As shown by reference number 545, in some aspects, the indication of whether the P2P communication is to be relayed may be a single bit, with a first value of the bit (e.g., 0) indicating that the P2P communication is not to be relayed, and a second value of the bit (e.g., 1) indicating that the P2P communication is to be relayed. Alternatively, the indication may carry additional information, and may be more than one bit.

As shown by reference number 550, in some aspects, the P2P communication may include one or more UE identifiers that identify one or more corresponding UEs (e.g., relaying UEs) that are to relay the P2P communication. In this case, the UE 505 (e.g., the originating UE) may determine and explicitly identify the UEs that are to act as relaying UEs for the P2P communication. In some aspects, the UE 505 may determine which UE(s) are to act as relaying UE(s) based at least in part on one or more locations corresponding to one or more neighbor UEs. For example, a neighbor UE associated with a low pathloss parameter and/or a high line of sight parameter, such as UE 515 (e.g., located in an intersection with line of sight to UEs 505, 510, 520, 525, and 530), may be selected to act as a relaying UE to provide a significant improvement to range. Conversely, a neighbor UE associated with a high pathloss parameter and/or a low line of sight parameter, such as UE 510 (e.g., not located in an intersection and without a line of sight to UEs 525 and 530), may not be selected to act as a relaying UE.

To assist with the identification of UEs associated with favorable relaying conditions (e.g., low pathloss, clear line of sight, and/or the like), the UE 505 may store information (e.g., historical information) that indicates pathloss parameters, line of sight parameters, and/or the like associated with various locations. Additionally, or alternatively, the UE 505 may receive information, from one or more neighbor UEs and/or one or more base stations 110, that indicate such parameters. The UE 505 may identify, as potential relaying UEs, one or more neighbor UEs that are in a location with a favorable relaying condition and/or within a threshold proximity of a location with a favorable relaying condition.

Additionally, or alternatively, the UE 505 may determine which UE(s) are to act as relaying UE(s) based at least in part on a location of the UE 505 and one or more locations corresponding to one or more neighbor UEs. For example, the UE 505 may determine a distance between the UE 505 and a neighbor UE. In some cases, if the distance does not satisfy (e.g., is less than or equal to) a first threshold, then the UE 505 may not select that neighbor UE as a potential relaying UE due to a relatively small increase in range. Conversely, if the distance satisfies (e.g., is greater than or equal to) the first threshold, then the UE 505 may select that neighbor UE as a potential relaying UE due to a relatively large increase in range.

Additionally, or alternatively, if the distance satisfies (e.g., is greater than or equal to) a second threshold (e.g., that is larger than the first threshold), then the UE 505 may not select that neighbor UE as a potential relaying UE due to a large distance between the UE 505 and the neighbor UE, which may reduce the likelihood of successful reception of the P2P communication by the neighbor UE (thus making successful relaying less likely). Conversely, if the distance does not satisfy (e.g., is less than or equal to) the second threshold, then the UE 505 may select that neighbor UE as a potential relaying UE due to a higher likelihood of successful reception of the P2P communication by the neighbor UE.

For example, the UE 505 may not identify UE 510 as a relaying UE because the distance between the UE 505 and the UE 510 is too small, which may result in sub-optimal gains in range (e.g., as compared to identifying UE 515 as a relaying UE). Further, the UE 505 may not identify UE 520 as a relaying UE because the distance between the UE 505 and the UE 520 is too large, which may result in unsuccessful reception, by the UE 520, of the P2P communication transmitted by the UE 505. In this case, the UE 505 may identify the UE 515 as a relaying UE because the distance between the UE 505 and the UE 515 is greater than a first threshold (e.g., which caused the UE 510 to not be identified as a relaying UE) and less than a second threshold (e.g., which caused the UE 520 to not be identified as a relaying UE).

As shown by reference number 555, in some aspects, the P2P communication may indicate a relaying priority associated with the P2P communication. The relaying priority may be used to indicate and/or determine an order in which different P2P communications are to be relayed by a relaying UE. For example, a P2P communication with a higher relaying priority may be relayed before a P2P communication with a lower relaying priority (e.g., if other priorities, such as a packet priority, are the same). The relaying priority may be different from and/or may be indicated separately from a packet priority indicated in the P2P communication. However, in some aspects, the UE 505 may determine the relaying priority based at least in part on the packet priority (e.g., indicated by a QoS parameter), such as by assigning a higher relaying priority to P2P communications with a higher packet priority, and/or assigning a lower relaying priority to P2P communications with a lower packet priority. In this way, P2P communications with a higher packet priority may be relayed before P2P communications with a lower packet priority.

Additionally, or alternatively, the UE 505 may determine the relaying priority based at least in part on a range requirement associated with the P2P communication, a range estimation associated with the UE 505, a pathloss parameter associated with the UE 505, a speed of the UE 505, and/or the like. For example, the UE 505 may assign a higher relaying priority to a P2P communication when the P2P communication is associated with a relatively large range requirement, when the UE 505 is associated with a relatively small estimated range, when the UE 505 is associated with a relatively high pathloss parameter, when the UE 505 is associated with a relatively high speed, and/or the like. Conversely, the UE 505 may assign a lower relaying priority to a P2P communication when the P2P communication is associated with a relatively small range requirement, when the UE 505 is associated with a relatively large estimated range, when the UE 505 is associated with a relatively low pathloss parameter, when the UE 505 is associated with a relatively low speed, and/or the like. In this way, P2P communications that have high range requirement may be prioritized, P2P communications from UEs 505 in relatively unfavorable range conditions may be prioritized, and/or the like.

Some aspects are described herein in connection with P2P communications. These aspects may apply to various types of P2P communications and/or similar types of communications, such as V2X communications, D2D communications, sidelink communications, and/or the like.

As indicated above, FIG. 5 is provided as an example. Other examples may differ from what is described with respect to FIG. 5.

Figure 6:
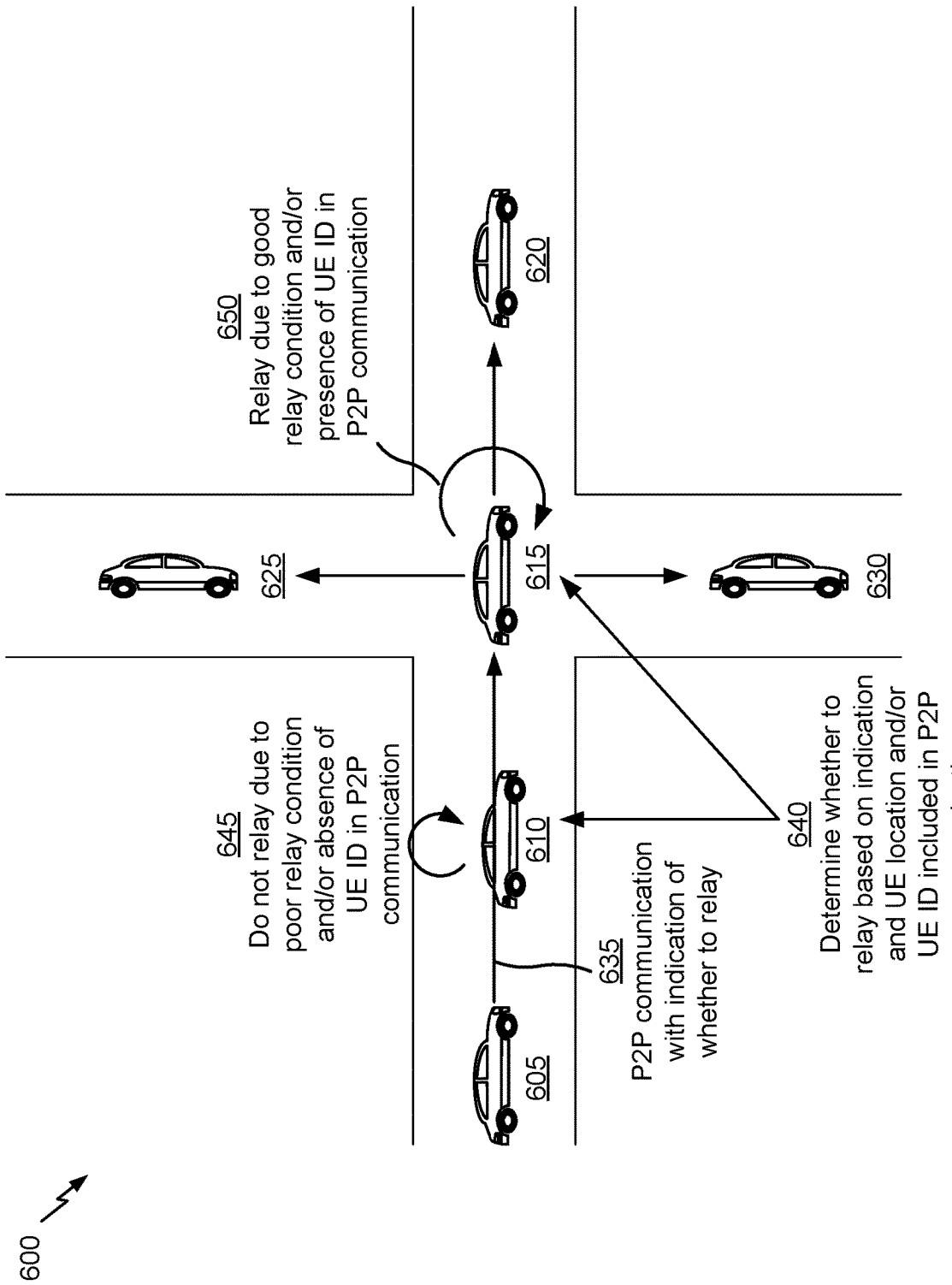

FIG. 6 is a diagram illustrating an example 600 of relaying for vehicular communications, in accordance with various aspects of the present disclosure.

As shown in FIG. 6, various UEs 605, 610, 615, 620, 625, and 630 may be associated with respective vehicles. These UEs may correspond to one or more UEs described elsewhere herein, such as UE 120, UE 305, UE 405, UE 410, UE 415, UE 505, UE 510, UE 515, UE 520, UE 525, UE 530 and/or the like. For example, UEs 605, 610, 615, 620, 625, and 630 in FIG. 6 may correspond to UEs 505, 510, 515, 520, 525, and 530 in FIG. 5, respectively. Although the UEs in FIG. 6 are shown as being associated with vehicles, in some aspects, one or more of the UEs in FIG. 6 may not be associated with a vehicle. For example, a UE 605, 610, 615, 620, 625, and/or 630 may be associated with infrastructure, a pedestrian, and/or the like. In FIG. 6, the UE 605 acts as an originating UE, and the UE 615 may act as a relaying UE.

As shown by reference number 635, the UE 610 and/or the UE 615 may receive a P2P communication that includes an indication of whether the P2P communication is to be relayed. This P2P communication may be transmitted by an originating UE (e.g., UE 605) as described above in connection with reference number 540 of FIG. 5. Additionally, or alternatively, this P2P communication may include information described above in connection with FIG. 5, such as a single bit indication of whether the UE is to be relayed, one or more UE identifiers that identify one or more corresponding UEs that are to relay the P2P communication, an indication of a relaying priority for the P2P communication, and/or the like.

As shown by reference number 640, a UE that receives the P2P communication may determine whether to relay the P2P communication based at least in part on the indication. For example, if the indication indicates that the P2P communication is not to be relayed, then the UE that receives the P2P communication may not relay the P2P communication. Conversely, if the indication indicates that the P2P communication is to be relayed, then the UE that receives the P2P communication may relay the P2P communication (e.g., if one or more other conditions and/or criteria, described below, are satisfied).

Additionally, or alternatively, the UE that receives the P2P communication may determine whether to relay the P2P communication based at least in part on a location of the UE that receives the P2P communication and/or a UE identifier, included in the P2P communication, that identifies the UE that receives the P2P communication and is associated with a request for the UE that receives the P2P communication to relay the P2P communication. The UE that receives the P2P communication may selectively relay the P2P communication based at least in part on the determination of whether to relay the P2P communication.

For example, the UE may relay the P2P communication if the UE is identified, in the P2P communication, as a relaying UE. Additionally, or alternatively, the UE may relay the P2P communication if the UE is associated with a favorable relaying condition, as described elsewhere herein (e.g., due to a location of the UE, a pathloss parameter associated with the UE satisfying a pathloss criteria, a line of sight parameter associated with the UE satisfying a line of sight criteria, a range associated with the UE satisfying a range criteria, and/or the like). As another example, the UE may not relay the P2P communication if the UE is not identified, in the P2P communication, as a relaying UE. Additionally, or alternatively, the UE may not relay the P2P communication if the UE is not associated with a favorable relaying condition. In this way, UEs that are located in favorable locations to increase a range of a relayed P2P communication may be configured to act as relaying UEs.

For example, as shown by reference number 645, the UE 610 may determine not to relay the P2P communication if a UE identifier, that identifies the UE 610, is absent from the P2P communication. In some aspects, the relay condition may be determined based at least in part on a location of the UE 610, a pathloss parameter of the UE 610, a line of sight parameter associated with the UE 610, an estimated range associated with the UE 610, a distance between the UE 610 and the originating UE 605, a distance between the UE 610 and a location identified as having a good relay condition (e.g., an intersection, a location identified as having a good line of sight relative to other locations, a good range, a good pathloss parameter, etc.), and/or the like.

In some aspects, one or more of the above parameters may be determined and/or estimated by the UE 610. Additionally, or alternatively, one or more of these parameters may be received from a network device, such as another UE, a base station 110, a server (e.g., via a base station 110), and/or the like. In this case, the network device may analyze radio performance information associated with multiple UEs associated with the location of the UE 610 over time, and may determine the one or more parameters based at least in part on this analysis.

As another example, as shown by reference number 650, the UE 615 may determine to relay the P2P communication if a UE identifier, that identifies the UE 615, is present in the P2P communication. Additionally, or alternatively (e.g., in the case where UE identifiers are not included in the P2P communication), the UE 615 may determine to relay the P2P communication if the UE 615 is associated with a good relay condition. As described above, the relay condition may be determined based at least in part on a location of the UE 615, a pathloss parameter of the UE 615, a line of sight parameter associated with the UE 615, an estimated range associated with the UE 615, a distance between the UE 615 and the originating UE 605, a distance between the UE 615 and a location identified as having a good relay condition, and/or the like. As also described above, one or more of the above parameters may be determined and/or estimated by the UE 615, and/or may be received from a network device, such as another UE, a base station 110, a server (e.g., via a base station 110), and/or the like.

In some aspects, if the UE 615 is associated with a poor relay condition, but a UE identifier of the UE 615 is present in the P2P communication, the presence of the UE identifier may override the poor relay condition, and the UE 615 may relay the P2P communication. Alternatively, if a UE identifier of the UE 615 is present in the P2P communication, but the UE 615 is associated with a poor relay condition, the poor relay condition may override the presence of the UE identifier, and the UE 615 may not relay the P2P communication.

In some aspects, a UE may activate or deactivate a relaying mode. When the relaying mode is activated, the UE may relay received P2P communications (e.g., that include an indication that the received P2P communications are to be relayed). When the relaying mode is deactivated, the UE may not relay received P2P communications (e.g., despite including an indication that the received P2P communications are to be relayed). In some aspects, the UE may activate or deactivate the relaying mode based at least in part on a location of the UE. For example, the location may be associated with a relaying condition, and the UE may activate the relaying mode when the relaying condition is favorable (e.g., when a pathloss parameter, a line of sight parameter, a range parameter, and/or the like satisfies a threshold). Similarly, the UE may deactivate the relaying mode when the relaying condition is unfavorable (e.g., when a pathloss parameter, a line of sight parameter, a range parameter, and/or the like does not satisfy a threshold).

In some aspects, a UE that receives a P2P communication that includes an indication to relay the P2P communication may prioritize the P2P communication for relaying based at least in part on a relaying priority associated with the P2P communication. As described above in connection with FIG. 5, in some aspects, the relaying priority may be indicated in the P2P communication. Additionally, or alternatively, the UE that receives the P2P communication may determine a relaying priority for the P2P communication. For example, the UE may determine the relaying priority based at least in part on a packet priority of the P2P communication, a range requirement associated with the P2P communication, a range estimation associated with an originating UE, a pathloss parameter associated with the originating UE, a speed of the originating UE, and/or the like, as described above in connection with FIG. 5.

Additionally, or alternatively, the UE that receives the P2P communication may determine a relaying priority for the P2P communication based at least in part on a location of an originating UE and/or a distance between the UE and the originating UE. For example, the UE may prioritize P2P communications received from originating UEs that are farther away from the UE, thereby providing more range for those P2P communications. Alternatively, the UE may prioritize P2P communications received from originating UEs that are closer to the UE, thereby providing better reaction time.

In some aspects, the UE that receives the P2P communication may determine whether to relay the P2P communication based at least in part on a determination of whether the P2P communication has already been relayed by another UE. For example, the UE may receive a P2P communication, may compare the P2P communication to previously received P2P communications, and may drop (e.g., without relaying) the newly received P2P communication if the P2P communication was previously received. If the P2P communication was not previously received, then the UE may relay the P2P communication. In this way, network resources and UE resources (e.g., processing power, memory, battery power, and/or the like) may be conserved by avoiding unnecessary relaying of P2P communications.

In some aspects, the UE that receives the P2P communication may determine a rate at which the P2P communication and one or more other P2P communications are to be relayed (e.g., a number of relaying transmissions per time period). In some aspects, the UE may determine the rate based at least in part on an indication received from another device, such as a base station 110, another UE, and/or the like. In some aspects, the base station 110 and/or a core network device associated with the base station 110 may determine the rate, and may indicate the rate to the UE (e.g., periodically, in system information, in a radio resource control (RRC) message, and/or the like). Additionally, or alternatively, the UE may determine the rate based at least in part on a congestion level of a network associated with the P2P communications (e.g., a congestion level of one or more sidelink channels that carry the P2P communications). For example, a relaying rate may be decreased when the network is more congested, and may be increased when the network is less congested, thereby improving reliability and increasing range when congestion is lower, while also preventing relaying from overloading the network when the network is congested.

Some aspects are described herein in connection with P2P communications. These aspects may apply to various types of P2P communications and/or similar types of communications, such as V2X communications, D2D communications, sidelink communications, and/or the like.

As indicated above, FIG. 6 is provided as an example. Other examples may differ from what is described with respect to FIG. 6.

Figure 7:
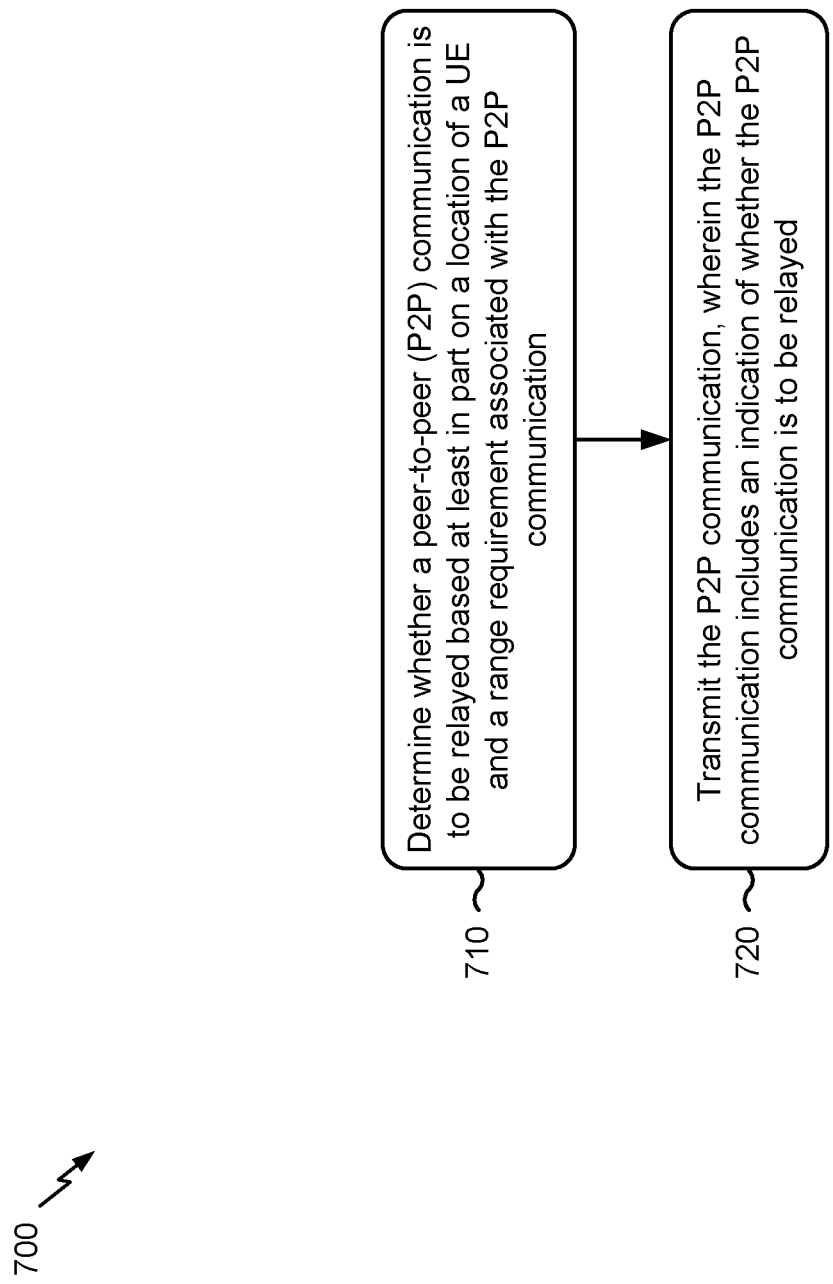
FIGS. 7 and 8 are diagrams illustrating example processes performed, for example, by a user equipment, in accordance with various aspects of the present disclosure.

FIG. 7 is a diagram illustrating an example process 700 performed, for example, by a UE, in accordance with various aspects of the present disclosure. Example process 700 is an example where a UE (e.g., UE 120, 305, 405, 410, 415, 505, 510, 515, 520, 525, 530, 605, 610, 615, 620, 625, 630, and/or the like) performs operations associated with relaying for vehicular communications. In some aspects, example process 700 may be performed by an originating UE.

As shown in FIG. 7, in some aspects, process 700 may include determining whether a peer-to-peer (P2P) communication is to be relayed based at least in part on a location of the UE and a range requirement associated with the P2P communication (block 710). For example, the UE (e.g., using controller/processor 280 and/or the like) may determine whether a P2P communication is to be relayed based at least in part on a location of the UE and a range requirement associated with the P2P communication, as described above in connection with FIG. 5.

As further shown in FIG. 7, in some aspects, process 700 may include transmitting the P2P communication, wherein the P2P communication includes an indication of whether the P2P communication is to be relayed (block 720). For example, the UE (e.g., using controller/processor 280, transmit processor 264, TX MIMO processor 266, MOD 254, antenna 252, and/or the like) may transmit the P2P communication, as described above in connection with FIG. 5. In some aspects, the P2P communication includes an indication of whether the P2P communication is to be relayed, Process 700 may include additional aspects, such as any single aspect or any combination of aspects described below and/or in connection with one or more other processes described elsewhere herein.

In a first aspect, the indication is a single bit.

In a second aspect, alone or in combination with the first aspect, the P2P communication includes one or more UE identifiers that identify one or more corresponding UEs that are to relay the P2P communication.

In a third aspect, alone or in combination with one or more of the first and second aspects, the one or more UE identifiers are determined based at least in part on at least one of: the location of the UE, one or more locations corresponding to the one or more corresponding UEs, the range requirement associated with the P2P communication, or a combination thereof.

In a fourth aspect, alone or in combination with one or more of the first through third aspects, the one or more UE identifiers are determined based at least in part on at least one of: a determination that the one or more corresponding UEs are located at a distance, from the UE, that satisfies one or more thresholds, a determination that the one or more corresponding UEs are located within a threshold proximity of a location (e.g., a low obstruction location having few or no obstructions between the UE and the one or more corresponding UEs) identified as having a line of sight parameter that satisfies a criteria, a determination that the one or more corresponding UEs are associated with a pathloss parameter that satisfies a condition, or a combination thereof.

In a fifth aspect, alone or in combination with one or more of the first through fourth aspects, the determination of whether the P2P communication is to be relayed is further based at least in part on at least one of: a priority associated with the P2P communication, a range estimation associated with the UE, a pathloss parameter associated with the UE, a speed of the UE, or a combination thereof.

In a sixth aspect, alone or in combination with one or more of the first through fifth aspects, the P2P communication indicates a relaying priority associated with the P2P communication, wherein the relaying priority is indicated separately from a packet priority indicated in the P2P communication.

In a seventh aspect, alone or in combination with one or more of the first through sixth aspects, the relaying priority is determined based at least in part on at least one of: a packet priority associated with the P2P communication, the range requirement associated with the P2P communication, a range estimation associated with the UE, a pathloss parameter associated with the UE, a speed of the UE, or a combination thereof.

In an eighth aspect, alone or in combination with one or more of the first through seventh aspects, the P2P communication is a vehicle-to-everything (V2X) communication.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
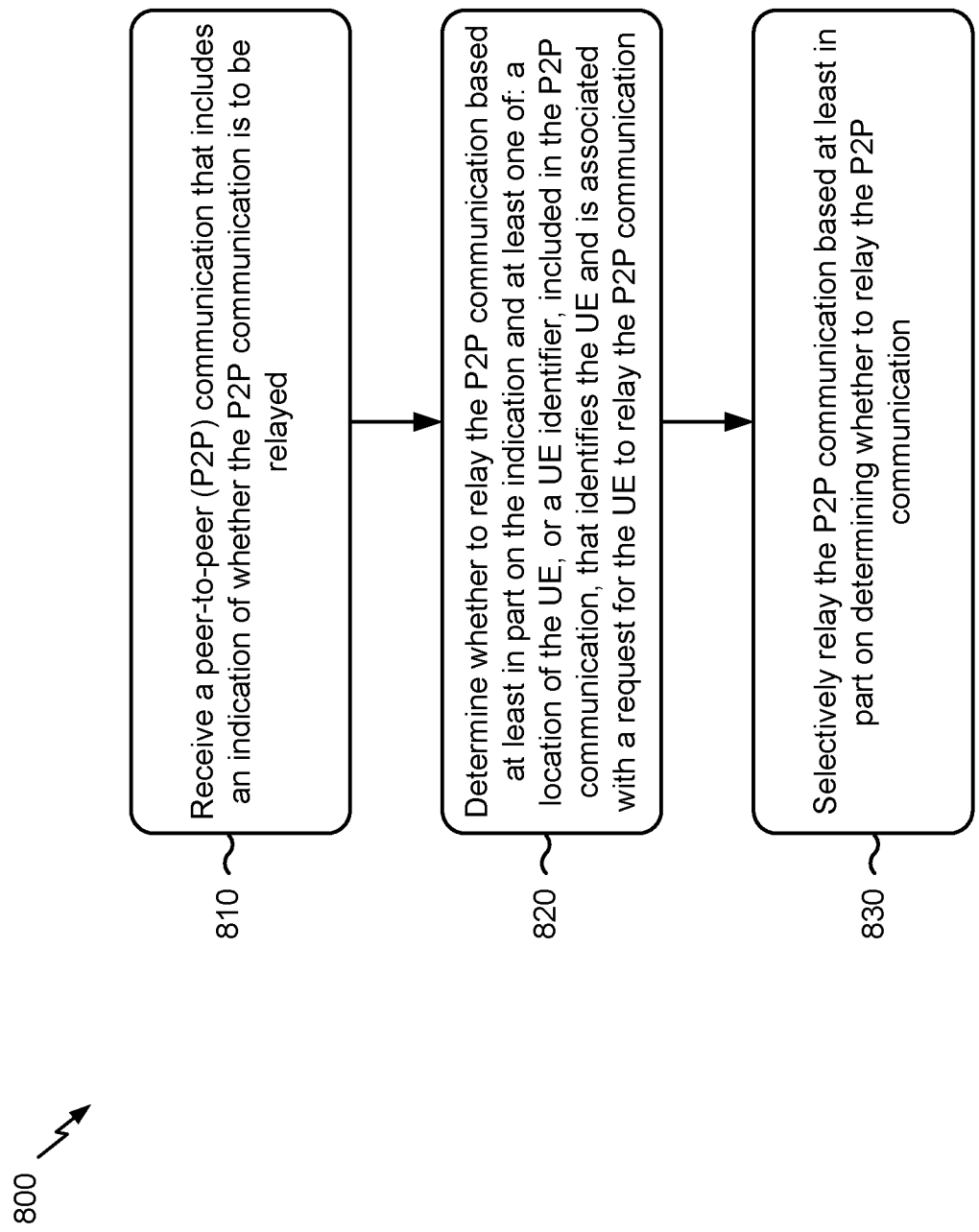

FIG. 8 is a diagram illustrating an example process 800 performed, for example, by a UE, in accordance with various aspects of the present disclosure. Example process 800 is an example where a UE (e.g., UE 120, 305, 405, 410, 415, 505, 510, 515, 520, 525, 530, 605, 610, 615, 620, 625, 630, and/or the like) performs operations associated with relaying for vehicular communications. In some aspects, example process 800 may be performed by a relaying UE.

As shown in FIG. 8, in some aspects, process 800 may include receiving a peer-to-peer (P2P) communication that includes an indication of whether the P2P communication is to be relayed (block 810). For example, the UE (e.g., using antenna 252, DEMOD 254, MIMO detector 256, receive processor 258, controller/processor 280, and/or the like) may receive a P2P communication that includes an indication of whether the P2P communication is to be relayed, as described above in connection with FIG. 6.

As further shown in FIG. 8, in some aspects, process 800 may include determining whether to relay the P2P communication based at least in part on the indication and at least one of: a location of the UE, or a UE identifier, included in the P2P communication, that identifies the UE and is associated with a request for the UE to relay the P2P communication (block 820). For example, the UE (e.g., using controller/processor 280 and/or the like) may determine whether to relay the P2P communication based at least in part on the indication, as described above in connection with FIG. 6. Additionally, or alternatively, the UE may determine whether to relay the P2P communication based at least in part on at least one of a location of the UE or a UE identifier, included in the P2P communication, that identifies the UE and is associated with a request for the UE to relay the P2P communication.

As further shown in FIG. 8, in some aspects, process 800 may include selectively relaying the P2P communication based at least in part on determining whether to relay the P2P communication (block 830). For example, the UE (e.g., using controller/processor 280, transmit processor 264, TX MIMO processor 266, MOD 254, antenna 252, and/or the like) may selectively relay the P2P communication based at least in part on determining whether to relay the P2P communication, as described above in connection with FIG. 6.

Process 800 may include additional aspects, such as any single aspect or any combination of aspects described below and/or in connection with one or more other processes described elsewhere herein.

In a first aspect, the indication is a single bit.

In a second aspect, alone or in combination with the first aspect, the P2P communication is relayed based at least in part on a determination that the UE identifier is included in the P2P communication.

In a third aspect, alone or in combination with one or more of the first and second aspects, the determination of whether to relay the P2P communication is based at least in part on a pathloss parameter associated with the location of the UE.

In a fourth aspect, alone or in combination with one or more of the first through third aspects, the pathloss parameter is estimated by the UE.

In a fifth aspect, alone or in combination with one or more of the first through fourth aspects, the pathloss parameter is received from a network device.

In a sixth aspect, alone or in combination with one or more of the first through fifth aspects, the pathloss parameter is determined based at least in part on analyzing radio performance information associated with multiple UEs in association with the location of the UE.

In a seventh aspect, alone or in combination with one or more of the first through sixth aspects, the determination of whether to relay the P2P communication is based at least in part on: a distance between the UE and an originating UE from which the P2P communication is received, a distance between the UE and a low obstruction location (e.g., a location having few or no obstructions between the UE and the originating UE) identified as having a line of sight parameter that satisfies a criteria, or a combination thereof.

In an eighth aspect, alone or in combination with one or more of the first through seventh aspects, the determination of whether to relay the P2P communication is based at least in part on whether a relaying mode is activated for the UE.

In a ninth aspect, alone or in combination with one or more of the first through eighth aspects, the relaying mode is activated based at least in part on the location of the UE.

In a tenth aspect, alone or in combination with one or more of the first through ninth aspects, the P2P communication is prioritized for relaying based at least in part on a relaying priority associated with the P2P communication.

In an eleventh aspect, alone or in combination with one or more of the first through tenth aspects, the relaying priority is indicated in the P2P communication.

In a twelfth aspect, alone or in combination with one or more of the first through eleventh aspects, the relaying priority is determined based at least in part on at least one of: a packet priority associated with the P2P communication, a range requirement associated with the P2P communication, a distance between the UE and an originating UE from which the P2P communication is received, a speed of the originating UE, a location of the originating UE, or a combination thereof.

In a thirteenth aspect, alone or in combination with one or more of the first through twelfth aspects, the determination of whether to relay the P2P communication is based at least in part on a determination of whether the P2P communication has already been relayed by another UE.

In a fourteenth aspect, alone or in combination with one or more of the first through thirteenth aspects, the P2P communication is a vehicle-to-everything (V2X) communication.

In a fifteenth aspect, alone or in combination with one or more of the first through fourteenth aspects, a rate at which a plurality of P2P communications, including the P2P communication, are relayed is determined based at least in part on one or more of: an indication from a base station, an indication from another UE, a congestion level of a network associated with the plurality of P2P communications, or a combination thereof.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    determining that a peer-to-peer (P2P) communication is to be relayed based at least in part on a location of the UE, a range requirement associated with the P2P communication, and a speed at which the UE is moving being greater than or equal to a threshold speed, wherein determining that the P2P communication is to be relayed based at least in part on the range requirement comprises:

determining that the P2P is to be relayed when the P2P communication is associated with a relatively high range requirement and determining that the P2P communication is not to be relayed when the P2P communication is associated with a relatively low range requirement; and transmitting the P2P communication, wherein the P2P communication includes an indication that the P2P communication is to be relayed.

2. The method of claim 1, wherein the indication is a single bit.

3. The method of claim 1, wherein the P2P communication includes one or more UE identifiers that identify one or more corresponding UEs that are to relay the P2P communication.

4. The method of claim 3, wherein the one or more UE identifiers are determined based at least in part on at least one of:
   the location of the UE,
   one or more locations corresponding to the one or more corresponding UEs,
   the range requirement associated with the P2P communication, or
   a combination thereof.

5. The method of claim 3, wherein the one or more UE identifiers are determined based at least in part on at least one of:
   a determination that the one or more corresponding UEs are located at a distance, from the UE, that satisfies one or more thresholds,
   a determination that the one or more corresponding UEs are located within a threshold proximity of a low obstruction location identified as having a line of sight parameter that satisfies a line of sight criteria,
   a determination that the one or more corresponding UEs are associated with a pathloss parameter that satisfies a pathloss criteria, or
   a combination thereof.

6. The method of claim 1, wherein the determination that the P2P communication is to be relayed is further based at least in part on at least one of:
   a priority associated with the P2P communication,
   a range estimation associated with the UE,
   a pathloss parameter associated with the UE, or
   a combination thereof.

7. The method of claim 1, wherein the P2P communication indicates a relaying priority associated with the P2P communication, wherein the relaying priority is indicated separately from a packet priority indicated in the P2P communication.

8. The method of claim 7, wherein the relaying priority is determined based at least in part on at least one of:
   a packet priority associated with the P2P communication,
   the range requirement associated with the P2P communication,
   a range estimation associated with the UE,
   a pathloss parameter associated with the UE,
   the speed at which the UE is moving, or
   a combination thereof.

9. The method of claim 1, wherein the P2P communication is a vehicle-to-everything (V2X) communication.

10. A user equipment (UE) for wireless communication, comprising:
   a memory; and
   one or more processors operatively coupled to the memory, the memory and the one or more processors configured to:
      determine that a peer-to-peer (P2P) communication is to be relayed based at least in part on a location of the UE, a range requirement associated with the P2P communication, and a speed at which the UE is moving being greater than or equal to a threshold speed, wherein the memory and the one or more processors are configured to determine that the P2P communication is to be relayed based at least in part on the range requirement by:
         determining that the P2P is to be relayed when the P2P communication is associated with a relatively high range requirement and determining that the P2P communication is not to be relayed when the P2P communication is associated with a relatively low range requirement; and
      transmit the P2P communication, wherein the P2P communication includes an indication that the P2P communication is to be relayed.

11. The UE of claim 10, wherein the P2P communication includes one or more UE identifiers that identify one or more corresponding UEs that are to relay the P2P communication.

12. The UE of claim 11, wherein the one or more UE identifiers are determined based at least in part on at least one of:
   the location of the UE,
   one or more locations corresponding to the one or more corresponding UEs,
   the range requirement associated with the P2P communication, or
   a combination thereof.

13. The UE of claim 11, wherein the one or more UE identifiers are determined based at least in part on at least one of:
   a determination that the one or more corresponding UEs are located at a distance, from the UE, that satisfies one or more thresholds,
   a determination that the one or more corresponding UEs are located within a threshold proximity of a low obstruction location identified as having a line of sight parameter that satisfies a line of sight criteria,
   a determination that the one or more corresponding UEs are associated with a pathloss parameter that satisfies a pathloss criteria, or
   a combination thereof.

14. The UE of claim 10, wherein the indication is a single bit.

15. The UE of claim 10, wherein the memory and the one or more processors are configured to determine that the P2P communication is to be relayed further based at least in part on at least one of:
   a priority associated with the P2P communication,
   a range estimation associated with the UE,
   a pathloss parameter associated with the UE, or
   a combination thereof.

16. The UE of claim 10, wherein the P2P communication indicates a relaying priority associated with the P2P communication, wherein the relaying priority is indicated separately from a packet priority indicated in the P2P communication.

17. The UE of claim 10, wherein the relaying priority is determined based at least in part on at least one of:
   a packet priority associated with the P2P communication,
   the range requirement associated with the P2P communication,
   a range estimation associated with the UE,
   a pathloss parameter associated with the UE,
   the speed at which the UE is moving, or
   a combination thereof.

18. The UE of claim 10, wherein the P2P communication is a vehicle-to-everything (V2X) communication.

* * * * *